(12) United States Patent
Keßler et al.

(10) Patent No.: US 11,840,294 B2
(45) Date of Patent: Dec. 12, 2023

(54) REGULATING DEVICE AND METHOD FOR REGULATING THE STEERING ANGLE OF A VEHICLE

(71) Applicant: Continental Automotive GmbH, Hannover (DE)

(72) Inventors: Philipp Keßler, Nierstein (DE); Stefan Feick, Bad Soden (DE); Michael Simon, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 44 days.

(21) Appl. No.: 17/654,899

(22) Filed: Mar. 15, 2022

(65) Prior Publication Data

US 2022/0289286 A1    Sep. 15, 2022

(30) Foreign Application Priority Data

Mar. 15, 2021    (DE) ..................... 10 2021 202 482.3

(51) Int. Cl.
*B62D 5/04*    (2006.01)
*B62D 6/00*    (2006.01)

(52) U.S. Cl.
CPC ........... *B62D 6/002* (2013.01); *B62D 5/0457* (2013.01)

(58) Field of Classification Search
CPC .... B62D 6/002; B62D 5/0457; B62D 5/0463; B62D 5/0472; B62D 6/008; B62D 6/04
See application file for complete search history.

(56) References Cited

U.S. PATENT DOCUMENTS 4,657,102 A * 4/1987 Kanazawa ........... B62D 7/1545
                                                180/415
4,683,972 A * 8/1987 Foerster ................. B62D 5/061
                                                180/422

(Continued)

FOREIGN PATENT DOCUMENTS

CN    105667592 B  *  4/2018  ............ B60W 10/20
CN    108698637 A  * 10/2018  ............. B62D 5/008

(Continued)

OTHER PUBLICATIONS

"Comparison of Feedback Control Techniques for Torque-Vectoring Control of Fully Electric Vehicles," De Novellis et al., IEEE Transactions on Vehicular Technology (vol. 63, Issue: 8, pp. 3612-3623); 2014-10-31. (Year: 2014).*

(Continued)

*Primary Examiner* — Khoi H Tran
*Assistant Examiner* — Jorge O Peche

(57) ABSTRACT

The disclosure relates to a regulating device for regulating the steering angle for a vehicle, comprising a first controller unit with a controller superposed thereon, the controller having a feedback path and a prefilter. The feedback path provides a first adjustment variable based on actual steering angle information which is provided by the first controller unit as an output variable and the prefilter provides a second adjustment variable based on nominal steering angle information. The controller is configured to form input information for the first controller unit based on the first and the second adjustment variables, wherein the feedback path has a first correction element, the transfer behavior of which can be adjusted. The prefilter has a second correction element, the transfer behavior of which can be adjusted. The controller is configured such that at least the controller gain of the first controller unit can be adjusted.

15 Claims, 2 Drawing Sheets

(56) References Cited

U.S. PATENT DOCUMENTS

| | | | | | |
|---|---|---|---|---|---|
| 4,836,319 A * | 6/1989 | Haseda | B62D 7/159 | | |
| | | | 701/42 | | |
| 5,321,616 A * | 6/1994 | Okuda | B62D 7/159 | | |
| | | | 701/37 | | |
| 5,373,444 A * | 12/1994 | Takahashi | B62D 7/159 | | |
| | | | 701/43 | | |
| 5,386,365 A * | 1/1995 | Nagaoka | B62D 7/159 | | |
| | | | 701/44 | | |
| 5,457,632 A * | 10/1995 | Tagawa | B62D 6/04 | | |
| | | | 701/43 | | |
| 5,740,040 A * | 4/1998 | Kifuku | G01P 3/44 | | |
| | | | 318/599 | | |
| 5,754,966 A * | 5/1998 | Ichikawa | B62D 7/159 | | |
| | | | 701/41 | | |
| 5,845,738 A * | 12/1998 | Nishino | B62D 5/0463 | | |
| | | | 180/443 | | |
| 5,853,064 A | 12/1998 | Hackl | | | |
| 5,927,430 A * | 7/1999 | Mukai | B62D 5/049 | | |
| | | | 701/41 | | |
| 6,079,513 A * | 6/2000 | Nishizaki | B62D 15/0235 | | |
| | | | 701/41 | | |
| 6,082,482 A * | 7/2000 | Kato | B62D 6/008 | | |
| | | | 701/41 | | |
| 6,112,845 A * | 9/2000 | Oyama | B62D 5/0463 | | |
| | | | 180/443 | | |
| 6,219,604 B1 * | 4/2001 | Dilger | B62D 6/008 | | |
| | | | 180/443 | | |
| 6,334,503 B1 * | 1/2002 | Fukumura | B62D 5/0496 | | |
| | | | 318/434 | | |
| 6,370,459 B1 * | 4/2002 | Phillips | B62D 6/008 | | |
| | | | 180/443 | | |
| 6,380,706 B1 * | 4/2002 | Kifuku | B62D 5/0463 | | |
| | | | 318/434 | | |
| 6,381,525 B1 * | 4/2002 | Hori | B62D 6/10 | | |
| | | | 701/41 | | |
| 6,474,436 B1 * | 11/2002 | Konigorski | B62D 6/008 | | |
| | | | 180/444 | | |
| 6,871,127 B2 * | 3/2005 | Dominke | B62D 5/003 | | |
| | | | 180/422 | | |
| 6,883,637 B2 * | 4/2005 | Nishizaki | B62D 5/0463 | | |
| | | | 701/43 | | |
| 7,092,805 B2 * | 8/2006 | Kasahara | B62D 5/006 | | |
| | | | 701/41 | | |
| 7,584,819 B2 * | 9/2009 | Hidaka | B62D 5/0463 | | |
| | | | 180/444 | | |
| 8,010,253 B2 * | 8/2011 | Lundquist | B62D 6/003 | | |
| | | | 180/443 | | |
| 8,340,871 B2 * | 12/2012 | Suzuki | B62D 15/025 | | |
| | | | 701/42 | | |
| 8,855,857 B2 * | 10/2014 | Shinoda | B62D 5/0463 | | |
| | | | 180/443 | | |
| 9,550,524 B2 * | 1/2017 | Takeda | B62D 6/008 | | |
| 9,586,619 B1 * | 3/2017 | Akatsuka | B62D 15/025 | | |
| 10,131,377 B2 * | 11/2018 | Minaki | B62D 5/0493 | | |
| 10,144,448 B2 * | 12/2018 | Minaki | B62D 1/286 | | |
| 10,427,712 B2 * | 10/2019 | Kunihiro | B62D 1/286 | | |
| 10,457,322 B2 * | 10/2019 | Yoshida | B62D 5/0463 | | |
| 10,562,562 B2 * | 2/2020 | Tsubaki | B62D 5/0409 | | |
| 10,562,568 B2 * | 2/2020 | Namikawa | B62D 15/025 | | |
| 10,604,151 B2 * | 3/2020 | Kim | B62D 6/10 | | |
| 10,661,796 B2 * | 5/2020 | Hajika | G06V 20/588 | | |
| 10,829,153 B1 * | 11/2020 | Taniguchi | B62D 15/021 | | |
| 11,027,777 B2 * | 6/2021 | Irie | B62D 15/025 | | |
| 11,685,430 B2 * | 6/2023 | Yoshida | B62D 15/021 | | |
| | | | 701/42 | | |
| 11,754,402 B2 * | 9/2023 | Tanaka | G01C 21/28 | | |
| | | | 701/410 | | |
| 2001/0017229 A1 * | 8/2001 | Kada | B62D 6/007 | | |
| | | | 180/446 | | |
| 2001/0027364 A1 * | 10/2001 | Matsuoka | B62D 5/046 | | |
| | | | 180/443 | | |
| 2002/0005314 A1 * | 1/2002 | Takehara | B62D 5/0466 | | |
| | | | 180/443 | | |
| 2002/0013647 A1 * | 1/2002 | Kawazoe | B60W 30/12 | | |
| | | | 180/443 | | |
| 2002/0022912 A1 * | 2/2002 | Urabe | B62D 6/10 | | |
| | | | 701/41 | | |
| 2002/0092700 A1 * | 7/2002 | Kim | B60T 7/12 | | |
| | | | 701/42 | | |
| 2003/0052639 A1 * | 3/2003 | Tanaka | B62D 5/0463 | | |
| | | | 318/632 | | |
| 2004/0060765 A1 * | 4/2004 | Mattson | B60T 8/1755 | | |
| | | | 180/422 | | |
| 2004/0186640 A1 * | 9/2004 | Norito | B62D 5/046 | | |
| | | | 180/443 | | |
| 2004/0262072 A1 * | 12/2004 | Hara | B62D 1/163 | | |
| | | | 180/402 | | |
| 2005/0004731 A1 * | 1/2005 | Bohm | B62D 15/025 | | |
| | | | 701/41 | | |
| 2005/0080532 A1 * | 4/2005 | Kato | B62D 6/003 | | |
| | | | 180/443 | | |
| 2005/0205339 A1 * | 9/2005 | Aizawa | B60W 30/045 | | |
| | | | 180/443 | | |
| 2005/0228564 A1 * | 10/2005 | Kato | B62D 6/008 | | |
| | | | 701/91 | | |
| 2005/0273236 A1 * | 12/2005 | Mori | B60T 8/1755 | | |
| | | | 701/41 | | |
| 2006/0041356 A1 * | 2/2006 | Shirato | B62D 1/28 | | |
| | | | 701/41 | | |
| 2006/0042859 A1 * | 3/2006 | Itoh | B62D 5/003 | | |
| | | | 180/402 | | |
| 2006/0080016 A1 * | 4/2006 | Kasahara | B62D 6/008 | | |
| | | | 701/41 | | |
| 2006/0090952 A1 * | 5/2006 | Ito | B62D 15/0235 | | |
| | | | 180/446 | | |
| 2007/0096672 A1 * | 5/2007 | Endo | B62D 5/0472 | | |
| | | | 318/432 | | |
| 2008/0021614 A1 * | 1/2008 | Endo | B62D 6/008 | | |
| | | | 701/41 | | |
| 2008/0027609 A1 * | 1/2008 | Aoki | B62D 5/0463 | | |
| | | | 701/43 | | |
| 2008/0119988 A1 * | 5/2008 | Yasui | B62D 7/159 | | |
| | | | 701/41 | | |
| 2008/0251312 A1 * | 10/2008 | Goto | B62D 6/003 | | |
| | | | 180/446 | | |
| 2009/0095562 A1 * | 4/2009 | Yasui | B62D 6/003 | | |
| | | | 180/412 | | |
| 2009/0105907 A1 * | 4/2009 | Yamaguchi | B62D 5/008 | | |
| | | | 701/41 | | |
| 2009/0222169 A1 * | 9/2009 | Held | B62D 6/008 | | |
| | | | 701/42 | | |
| 2010/0004825 A1 * | 1/2010 | Nakano | B62D 6/003 | | |
| | | | 701/42 | | |
| 2010/0094505 A1 * | 4/2010 | Kariatsumari | B62D 5/046 | | |
| | | | 701/41 | | |
| 2010/0217487 A1 * | 8/2010 | Murakami | B62D 5/0463 | | |
| | | | 701/42 | | |
| 2011/0001441 A1 * | 1/2011 | Kariatsumari | H02P 21/0003 | | |
| | | | 318/721 | | |
| 2011/0098888 A1 * | 4/2011 | Kariatsumari | H02P 21/26 | | |
| | | | 701/41 | | |
| 2011/0276229 A1 * | 11/2011 | Sugawara | B62D 5/0466 | | |
| | | | 701/42 | | |
| 2012/0046832 A1 * | 2/2012 | Kariatsumari | B62D 5/046 | | |
| | | | 701/41 | | |
| 2012/0097470 A1 * | 4/2012 | Yamasaki | B62D 5/0427 | | |
| | | | 180/402 | | |
| 2012/0271513 A1 * | 10/2012 | Yoneda | B62D 5/0484 | | |
| | | | 701/41 | | |
| 2012/0277956 A1 * | 11/2012 | Sasaki | B62D 7/159 | | |
| | | | 701/41 | | |
| 2012/0296525 A1 * | 11/2012 | Endo | B62D 5/0466 | | |
| | | | 701/42 | | |
| 2013/0060427 A1 * | 3/2013 | Kataoka | B62D 6/008 | | |
| | | | 701/42 | | |
| 2013/0066521 A1 * | 3/2013 | Watanabe | B62D 6/002 | | |
| | | | 701/41 | | |

(56) References Cited

U.S. PATENT DOCUMENTS

| | | | |
|---|---|---|---|
| 2013/0144493 A1* | 6/2013 | Hayama | B62D 5/001 701/43 |
| 2013/0238196 A1* | 9/2013 | Seto | B62D 5/0469 701/42 |
| 2014/0019008 A1* | 1/2014 | Nakamura | B62D 6/008 701/42 |
| 2014/0081524 A1* | 3/2014 | Tamaizumi | B62D 5/0463 701/42 |
| 2014/0121905 A1* | 5/2014 | Kluge | B62D 6/008 701/42 |
| 2014/0129086 A1* | 5/2014 | Takenaka | B62K 21/00 701/41 |
| 2014/0188342 A1* | 7/2014 | Takenaka | B62K 21/10 701/41 |
| 2014/0230533 A1* | 8/2014 | Greul | B62D 6/008 73/117.02 |
| 2014/0297122 A1* | 10/2014 | Kouchi | B62D 5/0472 701/41 |
| 2014/0303850 A1* | 10/2014 | Chai | G01M 17/06 701/42 |
| 2014/0316658 A1* | 10/2014 | Chai | B62D 6/008 701/42 |
| 2014/0343794 A1* | 11/2014 | Tamaizumi | B62D 5/0463 701/42 |
| 2015/0025745 A1* | 1/2015 | Tamura | B62D 5/046 701/41 |
| 2015/0057889 A1* | 2/2015 | Tamaizumi | B62D 5/0463 701/41 |
| 2015/0057892 A1* | 2/2015 | Tamaizumi | B62D 6/008 701/42 |
| 2015/0191199 A1* | 7/2015 | Tsubaki | B62D 6/10 701/42 |
| 2015/0191200 A1* | 7/2015 | Tsubaki | B62D 6/007 701/42 |
| 2015/0246686 A1* | 9/2015 | Takeda | G06V 20/588 701/41 |
| 2015/0274203 A1* | 10/2015 | Takeda | B62D 15/025 701/42 |
| 2015/0353124 A1* | 12/2015 | Chai | B62D 6/008 701/41 |
| 2016/0001810 A1* | 1/2016 | Tsubaki | B62D 6/08 701/42 |
| 2016/0075373 A1* | 3/2016 | Fukukawa | B62D 15/021 701/42 |
| 2016/0129934 A1* | 5/2016 | Akatsuka | B62D 15/025 180/446 |
| 2016/0159389 A1* | 6/2016 | Kuramitsu | B62D 5/049 180/446 |
| 2016/0229447 A1* | 8/2016 | Wada | B62D 6/007 |
| 2016/0280256 A1* | 9/2016 | Wei | B62D 5/0469 |
| 2017/0021858 A1* | 1/2017 | Kodera | B62D 5/0469 |
| 2017/0021859 A1* | 1/2017 | Kodera | B62D 6/008 |
| 2017/0066475 A1* | 3/2017 | Kudo | B62D 15/025 |
| 2017/0066476 A1* | 3/2017 | Kudo | B62D 5/0463 |
| 2017/0080969 A1* | 3/2017 | Ieyasu | B62D 5/0463 |
| 2017/0088166 A1* | 3/2017 | Kunihiro | B62D 15/025 |
| 2017/0113720 A1* | 4/2017 | Kodera | B62D 5/0472 |
| 2017/0137057 A1* | 5/2017 | Kitazume | B62D 5/0466 |
| 2017/0158238 A1* | 6/2017 | Takaso | G05D 1/0246 |
| 2017/0166243 A1* | 6/2017 | Sugawara | B62D 6/02 |
| 2017/0183027 A1* | 6/2017 | Kimura | B62D 5/0466 |
| 2017/0217477 A1* | 8/2017 | Akatsuka | B62D 6/007 |
| 2017/0259849 A1* | 9/2017 | Fukukawa | G01C 21/34 |
| 2017/0274928 A1* | 9/2017 | Minaki | B62D 15/0285 |
| 2017/0297614 A1* | 10/2017 | Minaki | B62D 15/025 |
| 2017/0305459 A1* | 10/2017 | Minaki | B62D 1/28 |
| 2018/0037256 A1* | 2/2018 | Maeda | B62D 6/008 |
| 2018/0111642 A1* | 4/2018 | Endo | B62D 6/008 |
| 2018/0134310 A1* | 5/2018 | Benak | B62D 5/008 |
| 2018/0178838 A1* | 6/2018 | Inoue | B62D 15/025 |
| 2018/0181130 A1* | 6/2018 | Inoue | B62D 15/025 |
| 2018/0186406 A1* | 7/2018 | Itou | B62D 5/0463 |
| 2018/0201306 A1* | 7/2018 | Tsubaki | B62D 1/286 |
| 2018/0201317 A1* | 7/2018 | Kudo | B60W 10/20 |
| 2018/0257700 A1* | 9/2018 | Ishikawa | B62D 5/0472 |
| 2018/0281849 A1* | 10/2018 | Irie | B62D 6/008 |
| 2018/0304918 A1* | 10/2018 | Kunihiro | B62D 5/0463 |
| 2018/0312169 A1* | 11/2018 | Harai | B60R 21/00 |
| 2018/0354549 A1* | 12/2018 | Tsubaki | H02P 29/032 |
| 2019/0009779 A1* | 1/2019 | Kim | B62D 6/10 |
| 2019/0084613 A1* | 3/2019 | Tsubaki | B62D 1/286 |
| 2019/0161116 A1* | 5/2019 | Moreillon | B62D 6/00 |
| 2019/0168801 A1* | 6/2019 | Takase | B62D 6/00 |
| 2019/0176885 A1* | 6/2019 | Sung | B62D 6/10 |
| 2019/0193776 A1* | 6/2019 | Tsubaki | B62D 15/0235 |
| 2019/0193782 A1* | 6/2019 | Tsubaki | B62D 6/007 |
| 2019/0225260 A1* | 7/2019 | Tsubaki | B62D 6/002 |
| 2019/0225261 A1* | 7/2019 | Kodera | B62D 5/0463 |
| 2019/0233003 A1* | 8/2019 | Kodera | B62D 6/008 |
| 2019/0233004 A1* | 8/2019 | Kodera | B62D 6/008 |
| 2019/0256133 A1* | 8/2019 | Tsubaki | B62D 6/008 |
| 2019/0263446 A1* | 8/2019 | Tsubaki | B62D 6/00 |
| 2019/0300044 A1* | 10/2019 | Tsubaki | B62D 5/04 |
| 2019/0315403 A1* | 10/2019 | Irie | B62D 1/286 |
| 2019/0322309 A1* | 10/2019 | Takase | B62D 6/00 |
| 2019/0337556 A1* | 11/2019 | Tsubaki | B62D 6/007 |
| 2019/0344824 A1* | 11/2019 | Takase | H02P 21/22 |
| 2019/0359023 A1* | 11/2019 | Isshiki | B60G 17/018 |
| 2019/0359203 A1* | 11/2019 | Isshiki | B60W 30/02 |
| 2019/0359219 A1* | 11/2019 | Isshiki | B60W 40/06 |
| 2019/0359247 A1* | 11/2019 | Tsubaki | B62D 1/286 |
| 2019/0359248 A1* | 11/2019 | Tsubaki | B62D 5/0463 |
| 2019/0359250 A1* | 11/2019 | Isshiki | B62D 5/0463 |
| 2019/0362570 A1* | 11/2019 | Kikuta | B62D 6/00 |
| 2020/0010111 A1* | 1/2020 | Tsubaki | B62D 5/0463 |
| 2020/0033146 A1* | 1/2020 | Cash | G01S 19/51 |
| 2020/0062296 A1* | 2/2020 | Kim | G05D 1/0061 |
| 2020/0070878 A1* | 3/2020 | Du | B62D 7/18 |
| 2020/0094870 A1* | 3/2020 | Shoji | B62D 6/008 |
| 2020/0108857 A1* | 4/2020 | Tsubaki | B62D 5/04 |
| 2020/0156698 A1* | 5/2020 | Tsubaki | B62D 5/0463 |
| 2020/0172156 A1* | 6/2020 | Tamaizumi | B62D 6/008 |
| 2020/0223477 A1* | 7/2020 | Tamaizumi | B62D 5/0463 |
| 2020/0231204 A1* | 7/2020 | Isshiki | B62D 5/0463 |
| 2020/0283063 A1* | 9/2020 | Kashi | B62D 6/008 |
| 2020/0290668 A1* | 9/2020 | Moreillon | B62D 15/025 |
| 2020/0317261 A1* | 10/2020 | Shoji | B60W 50/14 |
| 2020/0324808 A1* | 10/2020 | Kodera | B62D 15/025 |
| 2020/0331517 A1* | 10/2020 | Toko | B62D 5/0493 |
| 2020/0361525 A1* | 11/2020 | Kodera | B62D 6/008 |
| 2020/0361526 A1* | 11/2020 | Stoltze | B62D 15/025 |
| 2020/0369316 A1* | 11/2020 | Tsubaki | B62D 5/0493 |
| 2020/0391789 A1* | 12/2020 | Kim | B62D 6/002 |
| 2020/0398893 A1* | 12/2020 | Shoji | B62D 6/08 |
| 2020/0406964 A1* | 12/2020 | Hultén | B62D 6/008 |
| 2021/0061344 A1* | 3/2021 | Kitazume | B62D 1/286 |
| 2021/0100530 A1* | 4/2021 | Park | A61B 8/4254 |
| 2021/0114653 A1* | 4/2021 | Tsubaki | B62D 5/0409 |
| 2021/0206426 A1* | 7/2021 | Kitazume | B62D 5/0409 |
| 2021/0253158 A1* | 8/2021 | Hultén | B62D 6/008 |
| 2021/0253161 A1* | 8/2021 | Yoshida | B62D 15/021 |
| 2021/0253164 A1* | 8/2021 | Irie | B62D 6/005 |
| 2021/0255640 A1* | 8/2021 | Imamura | G05D 1/0206 |
| 2021/0387669 A1* | 12/2021 | Sakaguchi | B62D 15/0215 |
| 2022/0009547 A1* | 1/2022 | Osajima | B62D 5/0463 |
| 2022/0041210 A1* | 2/2022 | Sakaguchi | B62D 6/002 |
| 2022/0063710 A1* | 3/2022 | Tsubaki | B62D 5/0421 |
| 2022/0089214 A1* | 3/2022 | Kodera | B62D 6/00 |
| 2022/0089218 A1* | 3/2022 | Kodera | B62D 6/02 |
| 2022/0135117 A1* | 5/2022 | Tsubaki | B62D 5/046 180/402 |
| 2022/0144334 A1* | 5/2022 | Kakas | B62D 6/008 |
| 2022/0144336 A1* | 5/2022 | Kim | G05B 13/024 |
| 2022/0250678 A1* | 8/2022 | Keßler | B62D 6/002 |
| 2022/0289288 A1* | 9/2022 | Hultén | B62D 5/0484 |
| 2022/0315103 A1* | 10/2022 | Mori | B62D 6/02 |
| 2022/0355856 A1* | 11/2022 | Tanaka | B62D 15/0215 |

(56) References Cited

U.S. PATENT DOCUMENTS

| | | | | |
|---|---|---|---|---|
| 2023/0166791 A1* | 6/2023 | Kim | ............... | B62D 6/08 180/402 |
| 2023/0278630 A1* | 9/2023 | Ono | ............... | B62D 15/025 701/41 |

FOREIGN PATENT DOCUMENTS

| | | | | | |
|---|---|---|---|---|---|
| CN | 109803874 | A | * | 5/2019 | |
| CN | 109963772 | A | * | 7/2019 | |
| CN | 110291001 | A | * | 9/2019 | |
| DE | 102021201141 | | | 12/1899 | |
| DE | 19601825 | | | 7/1997 | |
| DE | 102004048495 | A1 | | 11/2005 | |
| DE | 102007008342 | A1 | * | 8/2008 | ............ B62D 13/00 |
| DE | 102014208785 | A1 | | 11/2015 | |
| DE | 102018104473 | A1 | * | 10/2018 | ............ B62D 1/286 |
| DE | 102019210509 | A1 | | 1/2021 | |
| EP | 0718174 | A2 | * | 6/1996 | |
| EP | 1234746 | A1 | * | 8/2002 | ........... B62D 5/0463 |
| EP | 1291262 | A2 | * | 3/2003 | ........... B62D 5/0463 |
| EP | 1584544 | A2 | * | 10/2005 | ............ B62D 5/008 |
| EP | 3444167 | A1 | * | 2/2019 | |
| EP | 3556639 | A1 | * | 10/2019 | |
| JP | 11147483 | A | * | 6/1999 | ........... B62D 5/0463 |
| JP | 2000198453 | A | | 7/2000 | |
| JP | 2002029433 | A | * | 1/2002 | ........... B62D 5/0463 |
| JP | 2003285754 | A | * | 10/2003 | |
| JP | 2003285762 | A | * | 10/2003 | |
| JP | 2003291834 | A | * | 10/2003 | |
| JP | 2010188854 | A | | 9/2010 | |
| JP | 2015020604 | A | * | 2/2015 | |
| JP | 2015033942 | A | * | 2/2015 | |
| JP | 2015093569 | A | * | 5/2015 | |
| JP | 6213033 | B2 | * | 10/2017 | |
| JP | 6273706 | B2 | * | 2/2018 | |
| JP | 2018024281 | A | * | 2/2018 | ............ B62D 1/286 |
| JP | 2019131014 | A | | 8/2019 | |
| JP | 2019137370 | A | * | 8/2019 | |
| JP | 2020069990 | A | * | 5/2020 | ............ B62D 1/286 |
| JP | 2021133776 | A | * | 9/2021 | |
| WO | WO-2017138617 | A1 | * | 8/2017 | ............ B62D 5/008 |
| WO | WO-2018070511 | A1 | * | 4/2018 | |
| WO | WO-2018084190 | A1 | * | 5/2018 | |
| WO | 2018168897 | A1 | | 9/2018 | |
| WO | WO-2018168897 | A1 | * | 9/2018 | ............ B62D 1/286 |

OTHER PUBLICATIONS

"Power-steering control architecture for automatic driving;" Naranjo et al.; IEEE Transactions on Intelligent Transportation Systems ( vol. 6, Issue: 4, pp. 406-415); Dec. 1, 2005. (Year: 2005).*
"Design of Automatic Steering Controller for Trajectory Tracking of Unmanned Vehicles Using Genetic Algorithms;" Guo et al., IEEE Transactions on Vehicular Technology (vol. 61, Issue: 7, pp. 2913-2924); Oct. 1, 2012. (Year: 2012).*
"Robust two degree-of-freedom vehicle steering controller design;" Guvenc et al.; IEEE Transactions on Control Systems Technology (vol. 12, Issue: 4, pp. 627-636); Jul. 1, 2004. (Year: 2004).*
German Search Report dated Oct. 4, 2021 for the counterpart German Patent Application No. 10 2021 202 482.3.
Search Report and Written Opinion dated Aug. 9, 2022 from corresponding European patent application No. 22180012.3.
Search Report dated Jan. 23, 2023 from corresponding Japanese patent application No. 2022-018498.
Japanese Notice of Reasons for Refusal dated Jan. 31, 2023 from corresponding Japanese patent application No. 2022-018498.
Decision to Grant dated Apr. 28, 2023 for from corresponding Japanese patent application No. 2022-018498.
Intention to Grant European Patent dated Jun. 15, 2023 from corresponding European patent application No. 22180012.3.

* cited by examiner

REGULATING DEVICE AND METHOD FOR REGULATING THE STEERING ANGLE OF A VEHICLE

CROSS-REFERENCE TO RELATED APPLICATIONS

This application claims priority to German patent application No. 10 2021 202 482.3, filed on Mar. 15, 2021, which is hereby incorporated by reference.

TECHNICAL FIELD

The technical field relates to a regulating device and to a method for regulating the steering angle of a vehicle.

BACKGROUND

Electromechanical steering systems for vehicles (also EPS: Electric Power Steering) are in principle known. A program-controlled electric actuator supports and superposes the steering movements of the driver by transferring forces to the steering mechanics.

In addition, it is known that electromechanical steering systems have regulating devices in order to moderate or suppress disturbing influences during automated driving (within the framework of SAE Level 2 and higher). Such regulating devices have an integrating regulating component in order to compensate for the transverse forces building up.

Known regulating devices have an interface via which the control behavior can be adjusted. As a result, the control behavior can be adjusted to the driving condition or the respective driving situation.

It is problematic that it is not possible to influence the control behavior in the manner described if the regulating device does not have such an interface or the construction of the regulating device is not known and it is therefore not possible to adjust the control behavior in a manner that depends on the driving situation. Thus, loading integrating components in the steering angle regulation can then, for example, continue to cause unwanted vehicle behavior.

As such, it is desirable to present a regulating device which makes it possible to influence the regulating behavior of the steering angle regulation even if no interface with such influencing is provided.

SUMMARY

According to a first aspect, the disclosure relates to a regulating device for regulating the steering angle of a vehicle. The regulating device comprises a first controller unit, the regulating behavior of which has at least one integrating component. The first controller unit may form the basic steering angle regulation, the control behavior of which is to be adjusted. It comprises the controller which provides a manipulated variable, the actuator which receives the manipulated variable, and the mechanical components of the steering. In addition, a controller superposed on the first controller unit is provided. This superposed controller is configured to alter the regulating behavior of the superposed first controller unit. The superposed controller has a feedback path and a prefilter. The feedback path is configured to provide a first adjustment variable based on actual steering angle information which is provided by the first controller unit as an output variable. The prefilter is configured to provide a second adjustment variable based on nominal steering angle information. In addition, the superposed controller is designed to form input information for the first controller unit based on the first and the second adjustment variable. The feedback path has a first correction element, the transfer behavior of which can be adjusted based on at least one control variable. The prefilter has a second correction element, the transfer behavior of which can be adjusted based on at least one control variable. The superposed controller is configured in such a way that at least the controller gain of the first controller unit can be adjusted based on the control variable. The expression "at least the control gain can be adjusted" within the meaning of the present disclosure means that the transfer behavior is either exclusively changed by changing a gain factor of the first controller unit in the form of a rational number or by applying a complex filter function.

The technical advantage of the regulating device according to the disclosure is that an adjustment of the controller gain or of the transfer behavior of the first controller unit can be achieved by the superposed controller based on a control variable although this does not itself offer any direct possibility of exerting influence in order to adjust the controller gain or the transfer behavior. In other words, the same result is achieved by influencing the input information supplied to the first controller unit as if the controller gain or the transfer behavior of the first controller unit itself can be directly altered by the control variable. This makes it possible to improve the regulating behavior in particular in such a way that oscillations can be avoided and disturbing influences of the integrating regulating component can be reduced.

According to an exemplary embodiment, the first correction element is configured to multiply the actual steering angle information by a factor dependent on the control variable or a complex filter function. In other words, the first correction element therefore receives the output information which is provided by the first controller unit as actual steering angle information and modifies said information based on the control variable to produce a first adjustment variable, based on which the input information which is supplied to the first controller unit is modified.

According to an exemplary embodiment, the factor is (1−P(s)), wherein P(s) is a correction factor dependent on the control signal s, the value of which correction factor indicates the adjustment of the controller gain of the first controller unit, or wherein P(s) is a complex filter function dependent on the control signal. By using this factor or such a function, it is possible to adjust the controller gain or the transfer behavior of the first controller unit from outside, without directly influencing the first controller unit itself.

According to an exemplary embodiment, the second correction element is configured to multiply the nominal steering angle information by a factor dependent on the control variable or a complex filter function. In other words, the second correction element therefore receives the steering angle information which is provided by a superposed control unit, for example a control unit of a driving assistance system, and modifies said information based on the control variable to produce a second adjustment variable. The adjustment variable in turn influences the input information which is supplied to the first controller unit.

According to an exemplary embodiment, the factor used in the second correction element is (1−P(s)), wherein P(s) is a correction factor dependent on the control signal s, the value of which correction factor indicates the adjustment of the controller gain of the first controller unit, or wherein P(s) is a complex filter function dependent on the control signal. This in turn makes it possible to adjust the controller gain or the transfer behavior of the first controller unit from outside, without directly influencing the first controller unit itself.

According to another exemplary embodiment, the factor used in the second correction element is P(s), wherein P(s) is a correction factor dependent on the control signal s, the value of which correction factor indicates the adjustment of the controller gain of the first controller unit, or wherein P(s) is a complex filter function dependent on the control signal. By using this factor, an adjustment of the controller gain or of the transfer behavior of the first controller unit is also possible from outside, without directly influencing the first controller unit itself.

According to an exemplary embodiment, a summation point is provided, at which the first adjustment variable is added to the nominal steering angle information and at which the second adjustment variable is subtracted from the nominal steering angle information, wherein the output information of the summation point forms the input variable of the first controller unit. Thanks to the adjustment of the nominal steering angle information occasioned therewith, an indirect adjustment of the controller gain of the first controller unit from outside is possible.

According to another exemplary embodiment, a summation point is provided, at which the first adjustment variable and the second adjustment variable are added, wherein the output information of the summation point forms the input variable of the first controller unit. Due to the adjustment of the nominal steering angle information occasioned therewith, a further alternative to the indirect adjustment of the controller gain of the first controller unit from outside is made possible.

According to an exemplary embodiment, the first and second correction element can be adjusted based on the identical control variable. As a result, a simplified regulating device can be achieved.

According to an exemplary embodiment, the first controller unit is a self-contained controller unit which does not have an external interface via which the controller gain of the first controller unit can be adjusted. In other words, the first controller unit forms a so-called black box, the control behavior of which cannot be adjusted externally so that a situation-dependent change in the control behavior would be possible. However, the controller superposed on the first controller unit as a subordinate controller unit makes it possible to compensate for the absence of such an interface by an external control loop.

According to an exemplary embodiment, the control variable is dependent on at least one of the following items of information:
  the driving situation in which the vehicle finds itself;
  the torque which a driver applies to the steering wheel;
  a coefficient of friction of the electromechanical steering;
  an estimated vibration parameter of the electromechanical steering;
  the signal-to-noise ratio of the input information which is supplied to the first controller unit (2).
As a result, the control behavior of the regulating device can be adjusted in a manner that depends on the driving conditions or the driving situation.

According to an exemplary embodiment, the controller gain can be adjusted by the control variable in the range of values between 0.2 and 3, in particular between 0.6 and 1.5. As a result, the desired influence on the control behavior can be advantageously achieved.

According to a further aspect, the disclosure relates to a method for regulating the steering angle of a vehicle by means of a first controller unit, the regulating behavior of which has at least one integrating component. A controller superposed on the first controller unit is provided, which has a feedback path and a prefilter. The feedback path provides a first adjustment variable based on actual steering angle information which is provided by the first controller unit as an output variable. The prefilter provides a second adjustment variable based on nominal steering angle information. The superposed controller provides input information for the first controller unit based on the first and the second adjustment variable. The feedback path has a first correction element, the transfer behavior of which is adjusted based on at least one control variable. The prefilter has a second correction element, the transfer behavior of which is adjusted based on at least one control variable. At least the controller gain of the first controller unit is adjusted by means of the superposed controller based on the control variable.

According to an embodiment of the method, the first controller unit is a self-contained controller unit which does not have an external interface via which the controller gain and/or the transfer function of the first controller unit can be adjusted. The controller gain and/or the transfer function of the first controller unit is/are set by an adjustment of the nominal steering angle information and an adjustment of fed-back actual steering angle information depending on the control variable. This makes it possible to indirectly adjust the controller gain and/or the transfer function of the first controller unit from outside.

The term "superposed controller" is understood to be at least one part of a control circuit which influences the input information of a subordinate controller unit, i.e., a lower regulating structure viewed in terms of hierarchy. The superposed controller can in particular use a signal or information from the subordinate controller unit in order to influence the control behavior of the subordinate controller unit as a result.

Within the meaning of the disclosure, the expressions "approximately", "substantially" or "roughly" mean deviations from the exact value in each case by +/−10%, preferably by +/−5% and/or deviations in the form of changes which are insignificant to the function.

Further developments, advantages and possible applications are set out by the following description of exemplary embodiments and by the figures. All of the features described and/or pictured per se or in any combination are fundamentally the subject-matter of the invention, independently of their combination in the claims or references back thereto. The content of the claims is also made an integral part of the description.

BRIEF DESCRIPTION OF THE DRAWINGS

The disclosure is explained in greater detail below on the basis of the figures with reference to exemplary embodiments, wherein.

DETAILED DESCRIPTION

Figure 1:
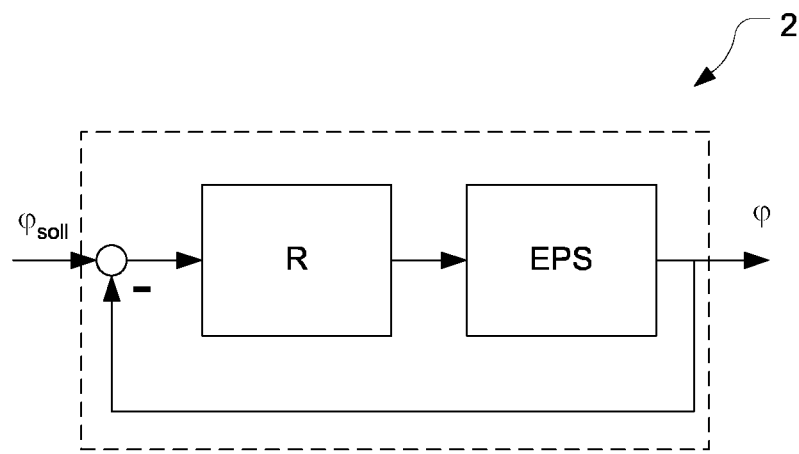
FIG. 1 shows by way of example a schematic representation of a first controller unit as steering angle regulation of an electromechanical steering system of a vehicle.

FIG. 1 shows by way of example a schematic block diagram of a first controller unit 2 which is used for regulating a steering device having an electromechanical drive (EPS: electric power steering). In the case of such a steering device, a program-controlled electric motor supports the steering movements of the driver or carries out at least partially inherent steering movements during autonomous or partially autonomous driving.

In the block wiring diagram, the block designated with R represents the steering angle controller which provides a manipulated variable for the electromechanical steering device EPS. The electromechanical steering device EPS comprises both the steering mechanics and the actuator.

The first controller unit 2 obtains, for example, the nominal steering angle $\varphi_{soll}$ which is provided for example by an electronic control unit, in particular a computer unit controlling an autonomous or partially autonomous driving function, as input information. The term "nominal steering angle information" is also used here for the nominal steering angle $\varphi_{soll}$.

The subtraction point of the first controller unit 2, at which a control difference is formed from the nominal steering angle $\varphi_{soll}$ and the actual steering angle $\varphi$, also referred to below as the actual steering angle information, is followed by a steering angle controller R for example, which provides for example a nominal actuating torque from the control difference as the manipulated variable. The steering angle controller R can be, for example, a PID controller. The steering angle controller R has an integrating component. This integrating component can lead to undesired driving behavior, for example oscillating steering movements. These oscillating steering movements lead to twitchy driving behavior and represent unnatural driving behavior for the driver, which is mostly perceived as disturbing.

The first controller unit 2 is for example a self-contained or enclosed controller unit which does not make possible an interface for supplying external control signals, via which the control behavior could be influenced in a manner that depends on the driving conditions, the situation and/or depending on driving commands of the human driver. Consequently, it is not possible to compensate for the disturbing control behavior arising inter alia from the integrating component directly at the first controller unit 2.

Figure 2:
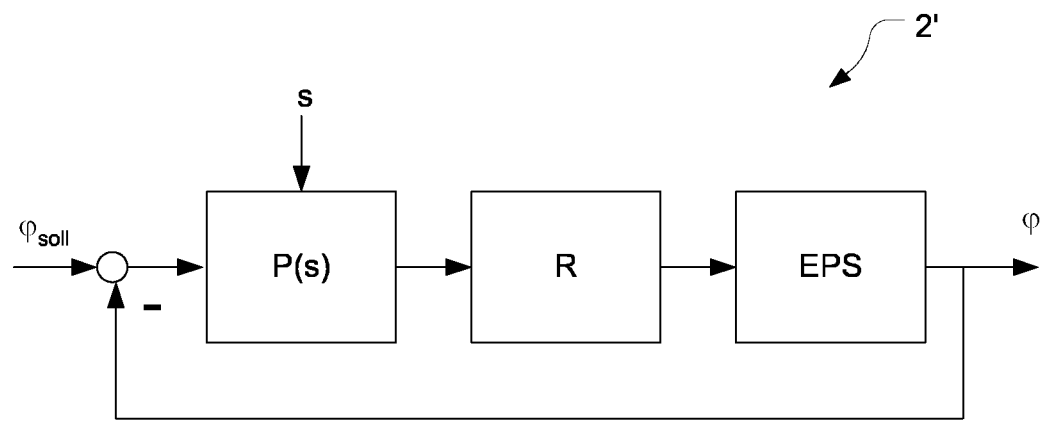
FIG. 2 shows by way of example a schematic representation of a desired, modified first controller unit as steering angle regulation of an electromechanical steering system of a vehicle.

FIG. 2 shows a modification of the first controller unit 2 shown in FIG. 1. This modified first controller unit 2' represents the desired steering angle regulation. The modification consists of being able to adjust the control behavior 2' of the modified first controller unit 2' by a control variable s. In particular, the controller gain P(s) can be adjusted based on the control variable s. As a result, the controller gain P(s) can be adjusted depending on the situation in such a way that the influences of the integrating component are reduced. This can be effected, for example, by the controller gain P(s) being reduced by the control signal s in certain situations. Thus, when the vehicle is driving straight ahead, oscillating steering behavior can for example be reduced, which leads to higher driving comfort. Even during cooperative driving, in which the driver applies a steering torque to the steering wheel, it is advantageous to reduce the controller gain P(s) by the control signal s, in order to reduce a control behavior which acts against the steering torque of the driver.

In other driving situations, in particular during time-critical maneuvering such as for example emergency avoiding maneuvers, it is possible to increase the controller gain P(s) in order to be able to react more dynamically to the respective driving situation. It is understood that, to this end, the steering angle regulation should have sufficient dynamics in order to avoid instabilities in the control behavior.

However, due to the above-described configuration of the first controller unit 2 as a self-contained or enclosed controller unit, it is not directly possible to alter the controller gain P(s) based on a control signal s.

Figure 3:
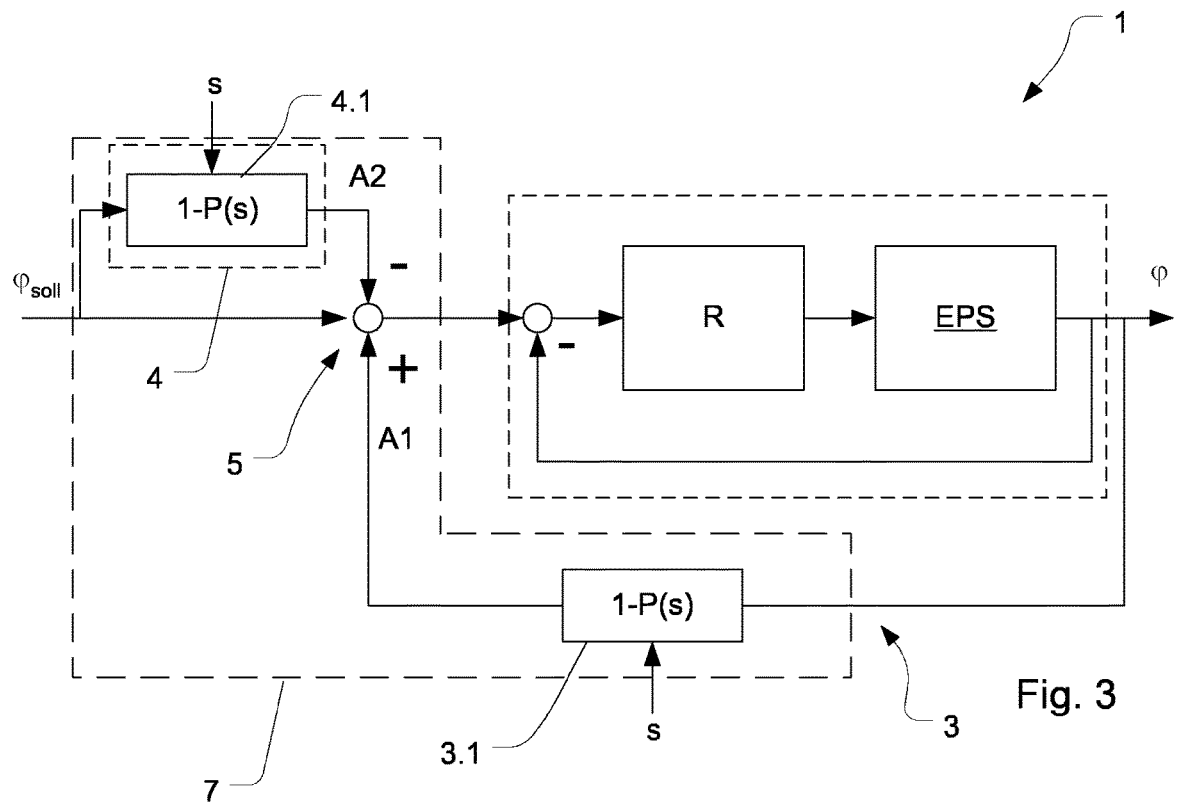
FIG. 3 shows by way of example and schematically a schematic representation of a first embodiment of a regulating device having the first controller unit shown in FIG. 1 and a superposed controller, by means of which the control gain can be adjusted depending on a control variable.

FIG. 3 shows a first exemplary embodiment of a regulating device 1 which is configured to make it possible to adjust the controller gain P(s) in the case of a self-contained controller unit 2.

The regulating device 1 comprises, in addition to the first controller unit 2, a superposed controller 7, by means of which an adjustment of the controller gain P(s) depending on the control variable s is made possible. The superposed controller 7 has a feedback path 3 and a prefilter 4. The feedback path 3 connects the output interface of the first controller unit 2, at which the actual steering angle information $\varphi$ is provided, to a summation point 5, which is coupled on the output side to the input interface of the first controller unit 2.

In the feedback path 3, a first correction element 3.1 is provided, the transfer behavior of which can be adjusted by the control variable s. The transfer function H of the first correction element 3.1 can, for example, be characterized by the following function:

$$H=1-P(s).$$

P(s) is the controller gain which is to be attained in the first controller unit 2 and s indicates the control variable. The feedback path 3 provides a first adjustment variable A1 which is supplied to the summation point 5 and is added there to the nominal steering angle information $\varphi_{soll}$.

The prefilter 4 has a second correction element 4.1, the transfer behavior of which can likewise be adjusted by the control variable s. The transfer function H of the second correction element 4.1 can, for example, be characterized by the following function:

$$H=1-P(s).$$

P(s) is the controller gain which is to be attained in the first controller unit 2 and s indicates the control variable. The prefilter 4 provides a second adjustment variable A2 which is likewise supplied to the summation point 5 and is subtracted there from the nominal steering angle information $\varphi_{soll}$.

In the exemplary embodiment according to FIG. 3, the prefilter 4 is provided in a bypass of the input signal of the regulating device 1, i.e., in addition to the nominal steering angle information $\varphi_{soll}$, the first adjustment variable A1 and the second adjustment variable A2 are additionally supplied to the summation point 5 such that, based on the nominal steering angle information $\varphi_{soll}$ and the adjustment variables A1 and A2 of the first controller unit 2, modified input information are supplied at the input interface thereof. The consequence of the modification of the input information by the superposed controller 7 is that the first controller unit 2 has a controller gain P(s) which can be altered based on the control variable s. In other words, the regulating device shown in FIG. 3 therefore has a control behavior which corresponds to the control behavior of the modified first controller unit 2' according to FIG. 2.

By influencing the input information, which has been adjusted by feedback from, and a modification of, the actual steering angle information φ and a modification of the nominal steering angle information $φ_{soll}$ supplied to the first controller unit 2, the desired control behavior can therefore be achieved with a controller gain which can be altered depending on the situation.

Figure 4:
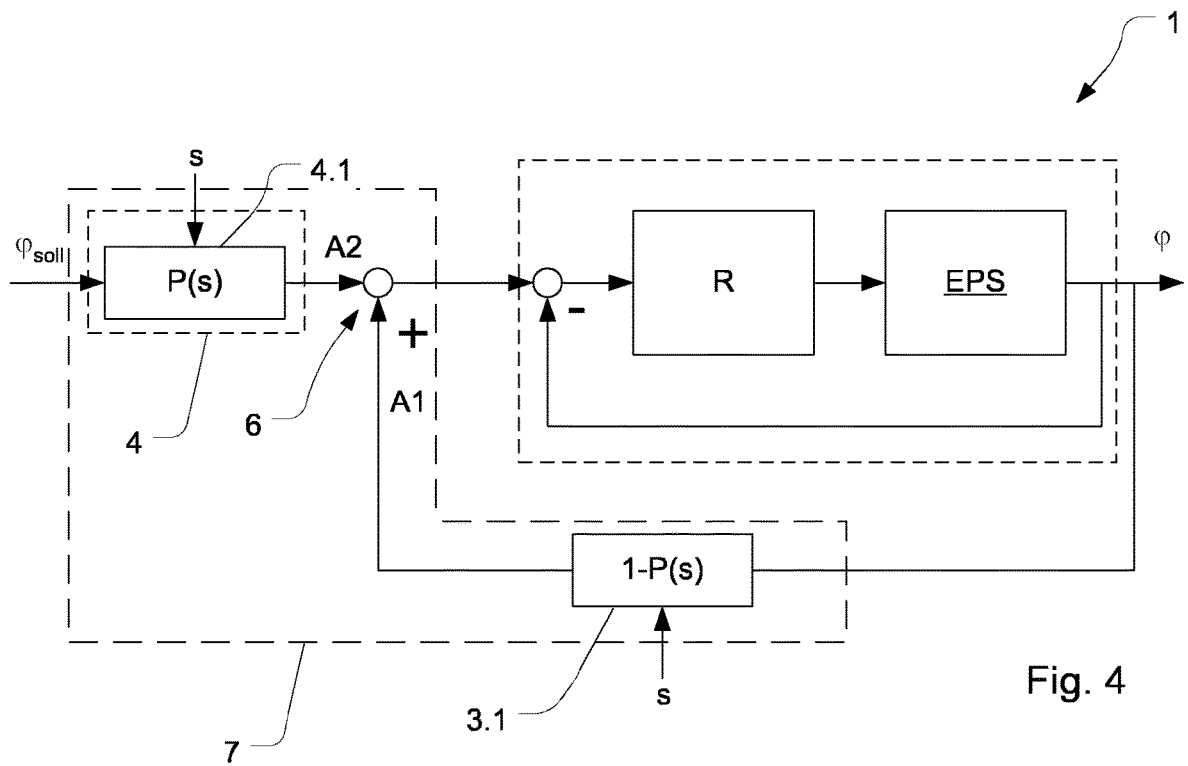
FIG. 4 shows by way of example and schematically a schematic representation of a second embodiment of a regulating device having the first controller unit shown in FIG. 1 and a superposed controller, by means of which the control gain can be adjusted depending on a control variable.

FIG. 4 shows a second exemplary embodiment of a regulating device 1 which is configured, in the case of a self-contained controller unit 2, to make it possible to adjust the controller gain P(s).

In addition to the first controller unit 2, the regulating device 1 comprises in turn a superposed controller 7, by means of which an adjustment of the controller gain P(s) is made possible depending on the control variable s. The superposed controller 7 has a feedback path 3 and a prefilter 4. The feedback path 3 connects the output interface of the first controller unit 2, at which the actual steering angle information φ is provided, to a summation point 6 which is coupled on the output side to the input interface of the first controller unit 2.

In the feedback path 3, a first correction element 3.1 is provided, the transfer behavior of which can be adjusted by the control variable s. The transfer function H of the first correction element 3.1 can, for example, be characterized by the following function:

$$H = 1 - P(s).$$

P(s) is the controller gain which is to be attained in the first controller unit 2 and s indicates the control variable. The feedback path 3 provides a first adjustment variable A1 which is supplied to the summation point 6 and is added there to the modified nominal steering angle information.

The prefilter 4 has a second correction element 4.1, the transfer behavior of which can likewise be adjusted by the control variable s. The transfer function H of the second correction element 4.1 can, for example, be characterized by the following function:

$$H = P(s).$$

P(s) is the controller gain which is to be attained in the first controller unit 2 and s indicates the control variable. The prefilter 4 provides a second adjustment variable A2 which is supplied to the summation point 6 as modified nominal steering angle information. In other words, the first and the second adjustment variable A1, A2 are thus added at the summation point 6 and the resulting sum information of the first controller unit 2 is provided as input information.

The consequence of the modification of the input information by the superposed controller 7 is in turn that the first controller unit 2 has a controller gain P(s) which can be altered based on the control variable s. In other words, the regulating device 1 shown in FIG. 4 therefore has a control behavior which corresponds to the control behavior of the modified first controller unit 2' according to FIG. 2.

By influencing the input information, which has been adjusted by feedback from, and a modification of, the actual steering angle information φ and a modification of the nominal steering angle information $φ_{soll}$ supplied to the first controller unit 2, the desired control behavior can therefore be achieved with a controller gain which can be altered depending on the situation.

One or more of the items of information indicated below can be used as the control variable s:

The steering torque applied by the human driver to the steering wheel. The controller gain can therefore be reduced for example as the steering torque of the human driver increases, in order to decrease an unwanted counteraction of the actuator against the steering maneuver initiated by the driver.

Information about certain driving situations, for example a recognized construction site. In this case it is advantageous to reduce the controller gain in order to decrease the counteraction of the steering angle regulation against the steering maneuvers initiated by the driver.

The estimated friction in the electromechanical steering which alters over the lifetime. That is to say, if the friction does diminish over time, a less strongly damped steering system is obtained as a consequence. In this case, the controller gain selected originally can be too high or can have too low a phase reserve. In addition, in the case of friction, a continuous vibration of the steering angle in the form of a limit cycle can be set, the characteristic values of which, namely the vibration amplitude and vibration frequency, depend on the level of friction and the frequency response of the interference transfer function of the steering angle regulation. A changed friction parameter therefore requires the adjustment of the frequency response of the steering angle regulation, if the characteristic values of the limit cycle are to remain the same.

Estimated vibration parameters such as for example amplitude and frequency of oscillations caused by the steering angle regulation of the electromechanical steering;

the signal-to-noise ratio of the input information which is supplied to the first controller unit 2.

The controller gain P(s) can be altered within a range of values of $P_{min} < P(s) < P_{max}$. In this case, $P_{min}$ can for example have a value of 0.2, in particular a value of 0.6 and $P_{max}$ can for example have a value of 3, in particular a value of 1.5.

It has been assumed above that the factor altered by the first and second correction element is the controller gain P(s), i.e., a rational number, via which the gain factor of the first controller unit 2 can be modified.

Deviating from this, the factor can also be formed by a complex filter function, with the aid of which the transfer behavior of the first controller unit 2, i.e., of the steering angle regulation, is modified from outside by a corresponding specification.

Complex filter functions are considered especially if, for example, excessive increases of the resonance of the EPS steering angle controller, for example brought about by too low a phase reserve, are to be subsequently or deliberately reduced. As a result, the amplitude of the vibration of the steering wheel and, therefore, also the characteristic values of the lateral oscillation of the vehicle can be favorably influenced during lane guidance. The simplest of the filter functions suitable for this purpose is a filter having high-pass behavior, as represented for example by a PD element. With the aid of the control variable s, the position of the zero of the PD element and, therefore, the degree of vibration damping can be varied. In addition, the gain factor of the PD element can furthermore be altered, with which the degree of vibration damping can likewise be influenced.

If the dynamics of the first controller unit 2 are to be increased depending on the driving situation, specifying the control variable s, a higher gain factor P can be chosen, for stability reasons, only up to a certain upper natural limit. If, nevertheless, a circular gain above the natural limit is required, it is advantageous if, instead of a gain factor in the form of a rational number for P(s), a complex filter function is used, the poles and zeros of which are to be chosen, taking into account control engineering stability criteria (e.g., Nyquist criterion). In most cases, this requires the design of filter zeros in such a way that the phase response of the open angle control circuit is raised in the region of the penetration frequency. In the simplest case, the filter function is then represented by a transfer element having two zeros and, due to the technical feasibility, also represented with two poles. Applications for the temporary implementation of higher steering angle controller dynamics are, for example, dynamic emergency avoiding maneuvers, for the execution of which higher angle dynamics can be required than specified by the design of the first controller unit 2.

The invention has been described above with reference to exemplary embodiments. It is understood that numerous changes and variations are possible, without departing from the scope of protection defined by the claims.

The invention claimed is:

1. A regulating device for regulating the steering angle for a vehicle, comprising:
a first controller unit,
wherein a controller superposed on the first controller unit is provided, which has a feedback path and a prefilter, wherein the feedback path provides a first adjustment variable based on actual steering angle information which is provided by the first controller unit as an output variable, and the prefilter provides a second adjustment variable based on nominal steering angle information,
wherein the superposed controller is configured to form input information for the first controller unit based on the first and the second adjustment variable, wherein the feedback path has a first correction element, the transfer behavior of which can be adjusted based on at least one control variable, wherein the prefilter has a second correction element, the transfer behavior of which can be adjusted based on the at least one control variable, and
the superposed controller is configured in such a way that at least the controller gain of the first controller unit can be adjusted based on the at least one variable.

2. The regulating device according to claim 1, wherein the controller gain is a rational number or is formed by a complex filter function.

3. The regulating device according to claim 1, wherein the first correction element is configured to multiply the actual steering angle information by a factor dependent on the at least one control variable or a complex filter function.

4. The regulating device according to claim 3, the factor is 1−P(s), wherein P(s) is a correction factor dependent on the at least one control signal, the value of which correction factor indicates the adjustment of the controller gain of the first controller unit, or wherein P(s) is a complex filter function dependent on the control signal.

5. The regulating device according to claim 1, wherein the second correction element is configured to multiply the nominal steering angle information by a factor dependent on the at least one control variable or a complex filter function.

6. The regulating device according to claim 5, wherein the factor is 1−P(s), wherein P(s) is a correction factor dependent on the at least one control signal, the value of which correction factor indicates the adjustment of the controller gain of the first controller unit, or wherein P(s) is a complex filter function dependent on the control signal.

7. The regulating device according to claim 5, wherein the factor is P(s), wherein P(s) is a correction factor dependent on the at least one control signal, the value of which correction factor indicates the adjustment of the controller gain of the first controller unit, or wherein P(s) is a complex filter function dependent on the control signal.

8. The regulating device according to claim 1, wherein a summation point is provided, at which the first adjustment variable is added to the nominal steering angle information and at which the second adjustment variable is subtracted from the nominal steering angle information, wherein the output information of the summation point forms the input variable of the first controller unit.

9. The regulating device according to claim 1, wherein a summation point is provided, at which the first adjustment variable and the second adjustment variable are added, wherein the output information of the summation point forms the input variable of the first controller unit.

10. The regulating device according to claim 1, wherein the first and second correction element can be adjusted based on the identical control variable.

11. The regulating device according to claim 1, wherein the first controller unit is a self-contained controller unit which does not have an external interface via which the controller gain of the first controller unit can be adjusted.

12. The regulating device according to claim 1, wherein the control variable is dependent on at least one of the following items of information:
the driving situation in which the vehicle finds itself;
the torque which a driver applies to the steering wheel;
a coefficient of friction of the electromechanical steering;
an estimated vibration parameter of the electromechanical steering;
the signal-to-noise ratio of the input information which is supplied to the first controller unit.

13. The regulating device according to claim 1, wherein the controller gain can be adjusted by the control variable in the range of values between 0.2 and 3.

14. A method for regulating the steering angle for a vehicle, comprising a first controller unit, wherein a controller superposed on the first controller unit is provided, which has a feedback path and a prefilter, wherein the feedback path provides a first adjustment variable based on actual steering angle information which is provided by the first controller unit as an output variable, and the prefilter provides a second adjustment variable based on nominal steering angle information, wherein the superposed controller provides input information for the first controller unit based on the first and the second adjustment variable, wherein the feedback path has a first correction element, the transfer behavior of which is adjusted based on at least one control variable, wherein the prefilter has a second correction element, the transfer behavior of which is adjusted based on at least one control variable, and at least the controller gain of the first controller unit is adjusted by the superposed controller based on the control variable.

15. The method according to claim 14, wherein the first controller unit is a self-contained controller unit which does not have an external interface via which the controller gain and/or the transfer function of the first controller unit can be adjusted, and the controller gain and/or the transfer function of the first controller unit is/are set by an adjustment of the nominal steering angle information and an adjustment of fed-back actual steering angle information is adjusted depending on the control variable.

* * * * *